(12) United States Patent
Hwang et al.

(10) Patent No.: US 11,995,539 B2
(45) Date of Patent: May 28, 2024

(54) ELECTRONIC APPARATUS AND METHOD FOR RE-LEARNING TRAINED MODEL

(71) Applicant: SAMSUNG ELECTRONICS CO., LTD., Suwon-si (KR)

(72) Inventors: Sungju Hwang, Daejeon (KR); Jaehong Yoon, Daejeon (KR); Jeongtae Lee, Busan (KR); Eunho Yang, Daejeon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 959 days.

(21) Appl. No.: 16/002,617

(22) Filed: Jun. 7, 2018

(65) Prior Publication Data

US 2018/0357539 A1 Dec. 13, 2018

Related U.S. Application Data

(60) Provisional application No. 62/517,442, filed on Jun. 9, 2017.

(30) Foreign Application Priority Data

Jan. 29, 2018 (KR) .................. 10-2018-0010936

(51) Int. Cl.
*G06N 20/20* (2019.01)
*G06N 3/04* (2023.01)
(Continued)

(52) U.S. Cl.
CPC .................. *G06N 3/08* (2013.01); *G06N 3/04* (2013.01); *G06N 3/045* (2023.01); *G06N 3/082* (2013.01)

(58) Field of Classification Search
CPC .......... G06N 3/08; G06N 3/04; G06N 3/0454; G06N 3/082
(Continued)

(56) References Cited

U.S. PATENT DOCUMENTS 10,360,581 B1 * 7/2019 Recce ................ G06Q 30/0275
10,726,334 B1 * 7/2020 Elnahrawy ........... G06N 3/0454
(Continued)

FOREIGN PATENT DOCUMENTS

JP        06-035887 A    2/1994
JP        5130523 B2     1/2013
(Continued)

OTHER PUBLICATIONS

Chaturvedi I., et al., (Sep. 16, 2014) https://www.sciencedirect.com/science/article/pii/S0165168414004198 (Year: 2014).*
(Continued)

*Primary Examiner* — Brandon S Cole
(74) *Attorney, Agent, or Firm* — Sughrue Mion, PLLC

(57) ABSTRACT

A method for re-learning a trained model is provided. The method for re-learning a trained model includes: receiving a data set including the trained model consisting of a plurality of neurons and a new task; identifying a neuron associated with the new task among the plurality of neurons to selectively re-learn a parameter associated with the new task for the identified neuron; and dynamically expanding a size of the trained model on which the selective re-learning is performed if the trained model on which the selective re-learning has a preset loss value to reconstruct the input trained model.

5 Claims, 25 Drawing Sheets

(51) Int. Cl.
*G06N 3/045* (2023.01)
*G06N 3/08* (2023.01)
*G06N 3/082* (2023.01)
*G06N 20/10* (2019.01)

(58) Field of Classification Search
USPC .................................................. 706/1–62
See application file for complete search history.

(56) References Cited

U.S. PATENT DOCUMENTS

| | | | | |
|---|---|---|---|---|
| 10,963,792 | B1* | 3/2021 | Kim | ............... G06K 9/6259 |
| 2010/0235310 | A1* | 9/2010 | Gage | ................ G06N 3/082 |
| | | | | 706/14 |
| 2011/0320767 | A1* | 12/2011 | Eren | ................ G06N 20/00 |
| | | | | 712/30 |
| 2013/0018825 | A1* | 1/2013 | Ghani | ............... G06N 20/00 |
| | | | | 706/12 |
| 2013/0151450 | A1* | 6/2013 | Ponulak | ............. G06N 3/049 |
| | | | | 706/25 |
| 2015/0049634 | A1* | 2/2015 | Levchuk | ............. H04L 41/12 |
| | | | | 370/254 |
| 2015/0363688 | A1* | 12/2015 | Gao | ................ G06F 16/9032 |
| | | | | 706/27 |
| 2016/0055409 | A1 | 2/2016 | Majumdar et al. | |
| 2016/0174902 | A1* | 6/2016 | Georgescu | ............ G06V 10/82 |
| | | | | 600/408 |
| 2018/0046914 | A1* | 2/2018 | Li | ................... G06N 3/082 |
| 2018/0082185 | A1 | 3/2018 | Tanimoto et al. | |
| 2018/0322660 | A1* | 11/2018 | Smith | ............... G06V 20/698 |
| 2018/0357539 | A1* | 12/2018 | Hwang | ............... G06N 3/04 |

FOREIGN PATENT DOCUMENTS

| | | |
|---|---|---|
| KR | 10-2016-0096460 A | 8/2016 |
| KR | 10-2017-0044102 A | 4/2017 |
| WO | 2016/151618 A1 | 9/2016 |

OTHER PUBLICATIONS

Sankaran, A., et al., (May 12, 2016) https://www.sciencedirect.com/science/article/pii/S0031320316300607 (Year: 2016).*

A Learning Algorithm for Evolving Cascade Neural Networks, Vitaly Schetinin, TheorieLabor, Friedrich-Schiller University of Jena, Ernst-Abbe-Platz 4, 07740 Jena, Germany, http://nnlab.tripod.com, May 2005.

Two-Stage Parallel Partial Retraining Scheme for Defective Multi-Layer Neural Networks, Kunihito Yamamori Tom Abe Susumu Horiguchi,Japan Advanced Institute of Science and Technology,1-1 Asahi-Dai, Tatsunokuchi, Ishikawa 923-1292, Japan, {yamamori, beto, hori} @jaist.ac.jp . May 14-17, 2000.

Korean Notice of Allowance dated Apr. 26, 2020, issued in the Korean Application No. 10-2018-0010936.

* cited by examiner

FIG. 5

---
Algorithm 1 Incremental Learning of a Dynamically Expandable Network
---
   Input: Dataset $D = (D_1, \ldots, D_T)$, Thresholds $\tau, \sigma$
   Output: $W^T$
   for $t = 1, \ldots, T$ do
     if $t = 1$ then
       Train the network weights $W^1$ using Eq. 1
     else
       $W^t =$ SelectiveRetraining($W^{t-1}$) {Selectively retrain the previous network using Algorithm 2 }
       if $\mathcal{L}_t > \tau$ then
         $W^t =$ DynamicExpansion($W^t$) {Expand the network capacity using Algorithm 3}
       $W^t =$ Split($W^t$) {Split and duplicate the units using Algorithm 4 }

FIG. 6

---
Algorithm 2 Selective Retraining
---
Input: Datatset $D_t$, Previous parameter $W^{t-1}$
Output: network parameter $W^t$
Initialize $l \leftarrow L-1$, $S = \{o_t\}$
Solve Eq. 2 to obtain $W^t_{L,t}$
Add neuron i to S if the weight between i and ot in $W^t_{L,t}$ is not zero.
for $l = L-1, \ldots, 1$ do
   Add neuron i to S if there exists some neuron $j \in S$ such that $W^{l-1}_{l,ji} \neq 0$.
Solve Eq. 3 to obtain $W^t_S$

FIG. 7

---
Algorithm 3 Dynamic Network Expansion
---
  Input: Datatset $D_t$, Threshold $\tau$
  Perform Algorithm 2 and compute $\mathcal{L}$
  if $\mathcal{L} > \tau$ then
    Add k units $h^N$ at all layers
    Solve for Eq. 4 at all layers
  for $l = L - 1, \ldots, 1$ do
    Remove useless units in $h_l^N$

FIG. 8

---
Algorithm 4 Network Split/Duplication
---
Input: Weight $W^{t-1}$, Threshold $\sigma$
Perform Eq. 5 to obtain $\widetilde{W}^t$
for all hidden unit i do
   $p_i^t = \|w_i^t - w^{t-1}\|_2$
   if $p_i^t > \sigma$ then
      Copy i into i'
Perform Eq. 5 with the initialization of $\widetilde{W}^t$ to obtain $W^t$ Training time

FIG. 11C

| Models | AUC | Capacity |
|---|---|---|
| DNN-L2 | 0.7440±0.01 | 1 |
| DNN-L2-Selective | 0.7499±0.01 | 1 |
| DEN-Constant | 0.7580±0.01 | 1.89 |
| DEN-Dynamic | 0.7684±0.01 | 1.56±0.01 |

Expansion performance

ELECTRONIC APPARATUS AND METHOD FOR RE-LEARNING TRAINED MODEL

CROSS-REFERENCE TO RELATED APPLICATIONS

This application claims priority from Korean Patent Application No. 10-2018-0010936, filed on Jan. 29, 2018 in the Korean Intellectual Property Office and U.S. Provisional Application No. 62/517,442, filed on Jun. 9, 2017, in the USPTO the disclosure of which is incorporated herein by reference in its entirety.

BACKGROUND OF THE INVENTION

Field of the Invention

Apparatuses and methods consistent with the present disclosure relate to an electronic apparatus and a method for re-learning a trained model, and more particularly, to an electronic apparatus and a method for generating a trained model capable of performing partial learning only on a task corresponding to a new concept upon learning the new concept.

Description of the Related Art

Lifelong learning is a field of continual learning and real-time drift learning, and has an ideal goal to help learn a new concept using the already learned knowledge while increasing performance of the already learned concept upon learning the new concept.

In the case of incremental learning based on the existing time series, the already learned concept is forgotten upon learning the new concept, and therefore the degradation in overall performance may often occur, which is called a semantic drift.

As a conventional solution for solving such a problem, there is a method for learning a new concept through a network expansion while maintaining the already learned concepts. At this time, however, the network has been expanded by a fixed size, and as a result there is a limit in that computation cost is rapidly increased or the network does not actively cope with a network model situation.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

An object of the present disclosure is to provide an electronic apparatus and a method for generating a trained model capable of performing partial learning only on a task corresponding to a new concept upon learning the new concept.

According to an aspect of the present disclosure, a method for re-learning a trained model includes: receiving a data set including the trained model consisting of a plurality of neurons and a new task; identifying a neuron associated with the new task among the plurality of neurons to selectively re-learn a parameter associated with the new task for the identified neuron; and dynamically expanding a size of the trained model on which the selective re-learning is performed if the trained model on which the selective re-learning has a preset loss value to reconstruct the input trained model.

In the selective re-learning, a new parameter matrix may be computed to minimize a loss function for the input trained model and an objective function having a regularization term for sparsity, and the neuron associated with the new task is identified using the computed new parameter matrix.

In the selective re-learning, the new parameter matrix may be calculated using the data set for the network parameter consisting of only the identified neuron, and the computed new parameter matrix may be reflected to the identified neuron of the trained model to perform the selective re-learning.

In the reconstructing of the input trained model, if the trained model on which the selective re-learning is performed has a preset loss value, the fixed number of neurons for each layer may be added to the trained model on which the selective re-learning is performed and group sparsity may be used to eliminate unnecessary neurons from the added neurons, thereby reconstructing the input learning model.

In the reconstructing of the input trained model, an unnecessary neuron may be identified from the added neurons using a loss function for the input trained model, a regularization term for sparsity, and an objective function having a group regularization term for group sparsity.

In the reconstructing of the input trained model, if a change in the identified neuron has a preset value, the identified neuron may be duplicated to expand the input trained model, and the identified neuron may have the existing value to reconstruct the input trained model.

According to another aspect of the present disclosure, an electronic apparatus includes: a memory configured to store a data set including the trained model consisting of a plurality of neurons and a new task; and a processor configured to identify a neuron associated with the new task among the plurality of neurons to selectively re-learn a parameter associated with the new task for the identified neuron, and dynamically expand a size of the trained model on which the selective re-learning is performed if the trained model on which the selective re-learning has a preset loss value to reconstruct the input trained model.

The processor may compute a new parameter matrix to minimize a loss function for the input trained model and an objective function having a regularization term for sparsity, and identify the neuron associated with the new task using the computed new parameter matrix.

The processor may compute the new parameter matrix using the data set for the network parameter consisting of only the identified neuron, and reflect the computed new parameter matrix to the identified neuron of the trained model to perform the selective re-learning.

The processor may add the fixed number of neurons for each layer to the trained model on which the selective re-learning is performed and use group sparsity to eliminate unnecessary neurons from the added neurons if the trained model on which the selective re-learning is performed has a preset loss value, thereby reconstructing the input trained model.

The processor may identify an unnecessary neuron from the added neurons using a loss function for the input trained model, a regularization term for sparsity, and an objective function having a group regularization term for group sparsity.

In the reconstructing of the input trained model, if a change in the identified neuron has a preset value, the identified neuron may be duplicated to expand the input trained model, and the identified neuron may have the existing value to reconstruct the input trained model.

According to still another aspect of the present disclosure, there is provided a computer readable recording medium including a program for executing a method for re-learning a trained model in an electronic apparatus, wherein the method for re-learning a trained model includes: receiving a data set including the trained model consisting of a plurality of neurons and a new task; identifying a neuron associated with the new task among the plurality of neurons to selectively re-learn a parameter associated with the new task for the identified neuron; and dynamically expanding a size of the trained model on which the selective re-learning is performed if the trained model on which the selective re-learning has a preset loss value to reconstruct the input trained model.

As described above, according to various embodiments of the present disclosure, when the additional learning is performed based on the already pre-learned network model, the learning is not performed again on the whole, but only the additional part is learned by duplicating and splitting the network in the corresponding task unit to save the learning time and the computation.

Further, the effects that may be obtained or expected by the exemplary embodiments of the present disclosure shall be directly or implicitly disclosed in the detailed description of the present disclosure. For example, various effects that may be expected by the exemplary embodiments of the present disclosure shall be disclosed in the detailed description to be described below.

In addition, the technical problem to be solved in the present disclosure is not limited to the above-mentioned technical problems, and other technical problems can be clearly understood to those skilled in the art to which the present disclosure pertains from the following description.

BRIEF DESCRIPTION OF THE DRAWING FIGURES

The above and/or other aspects of the present invention will be more apparent by describing certain exemplary embodiments of the present invention with reference to the accompanying drawings, in which:

FIG. 5 is a diagram illustrating an incremental learning algorithm in the dynamically expandable network;

FIG. 6 is a diagram illustrating a selective re-learning algorithm;

FIG. 7 is a diagram illustrating an algorithm for the dynamically expandable method;

FIG. 8 is a diagram illustrating network split and duplication;

Figure 9A:
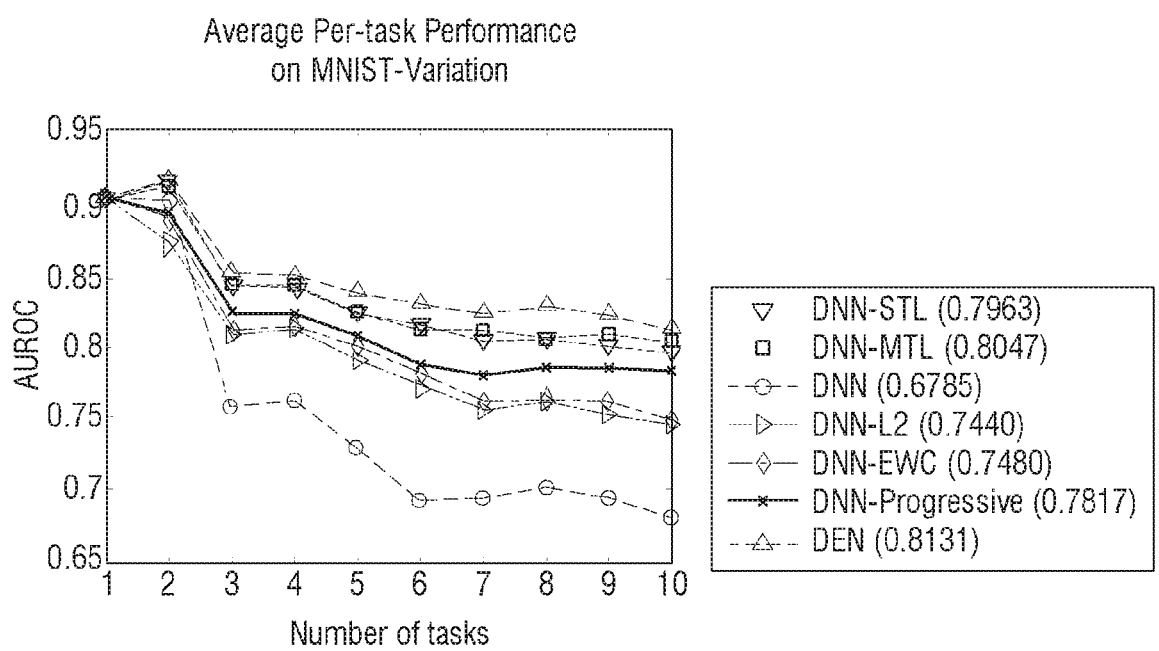
Figure 9B:
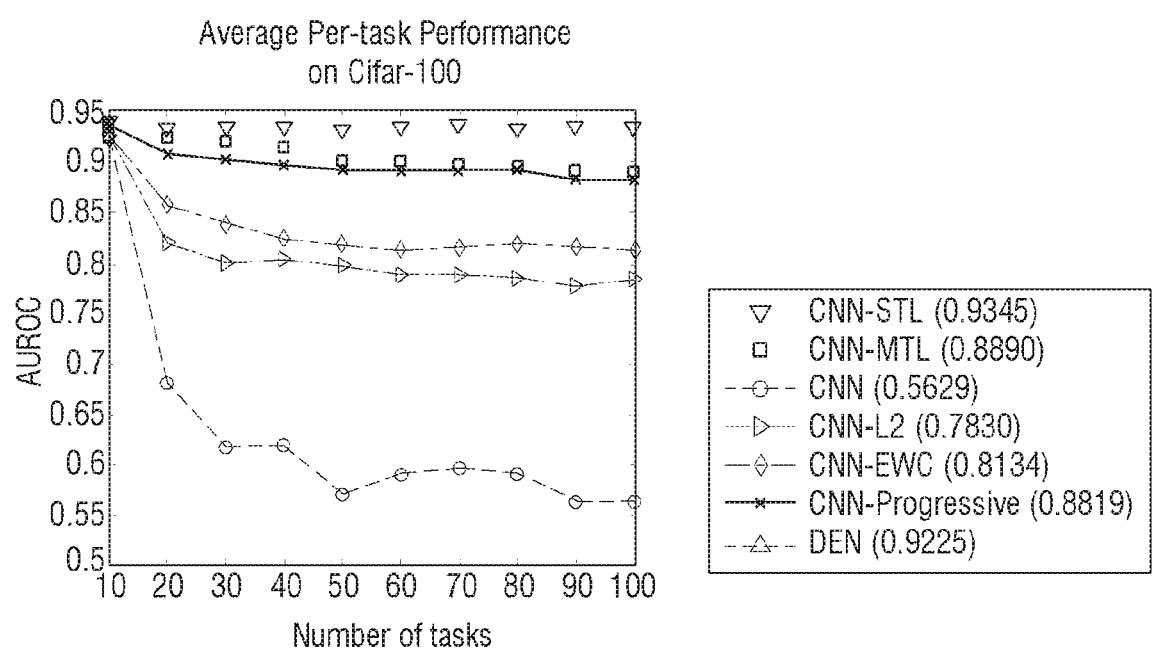
Figure 9C:
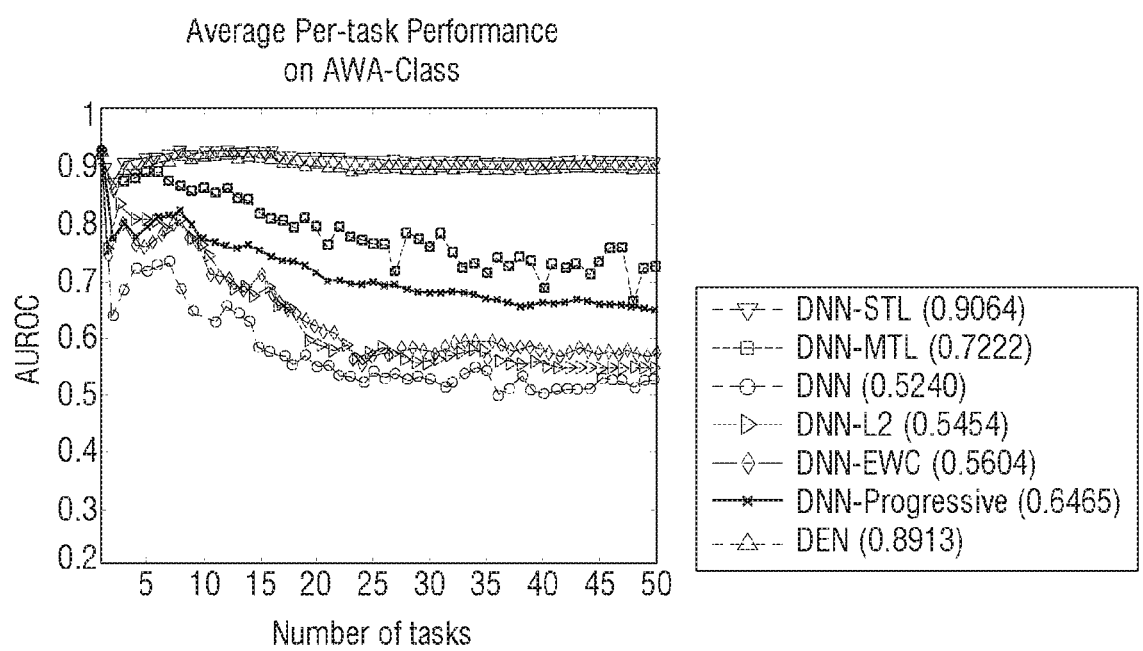
Figure 10A:
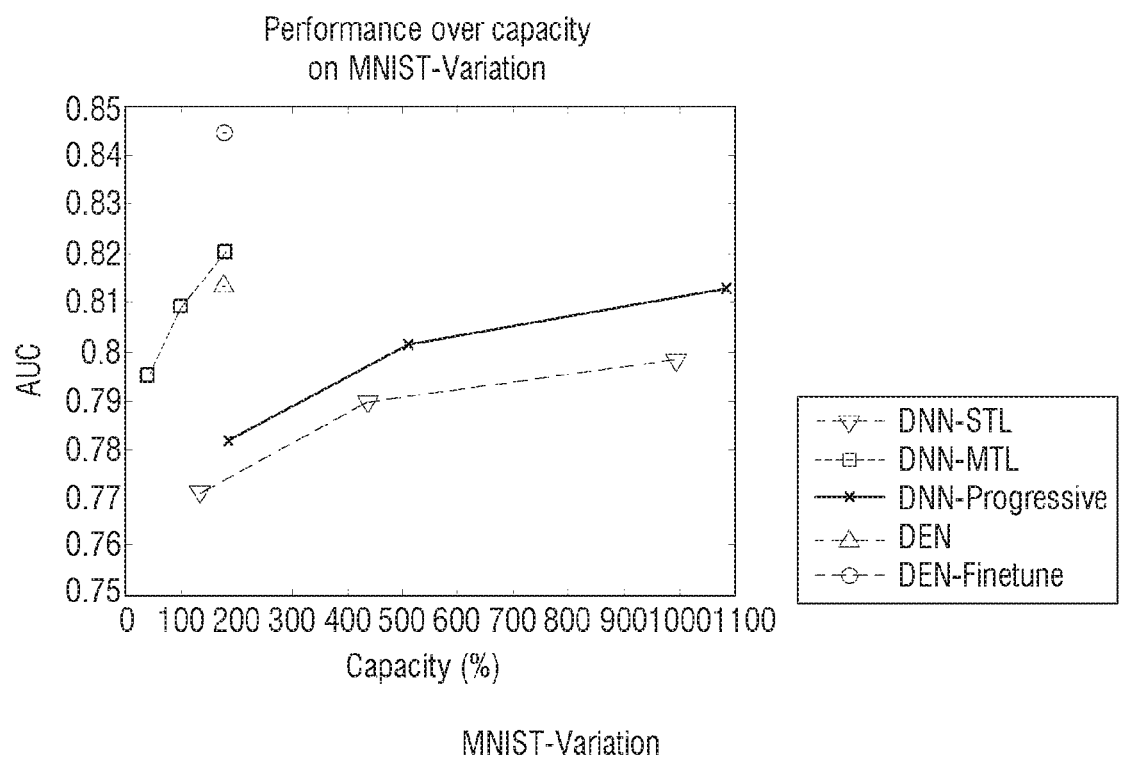
Figure 10B:
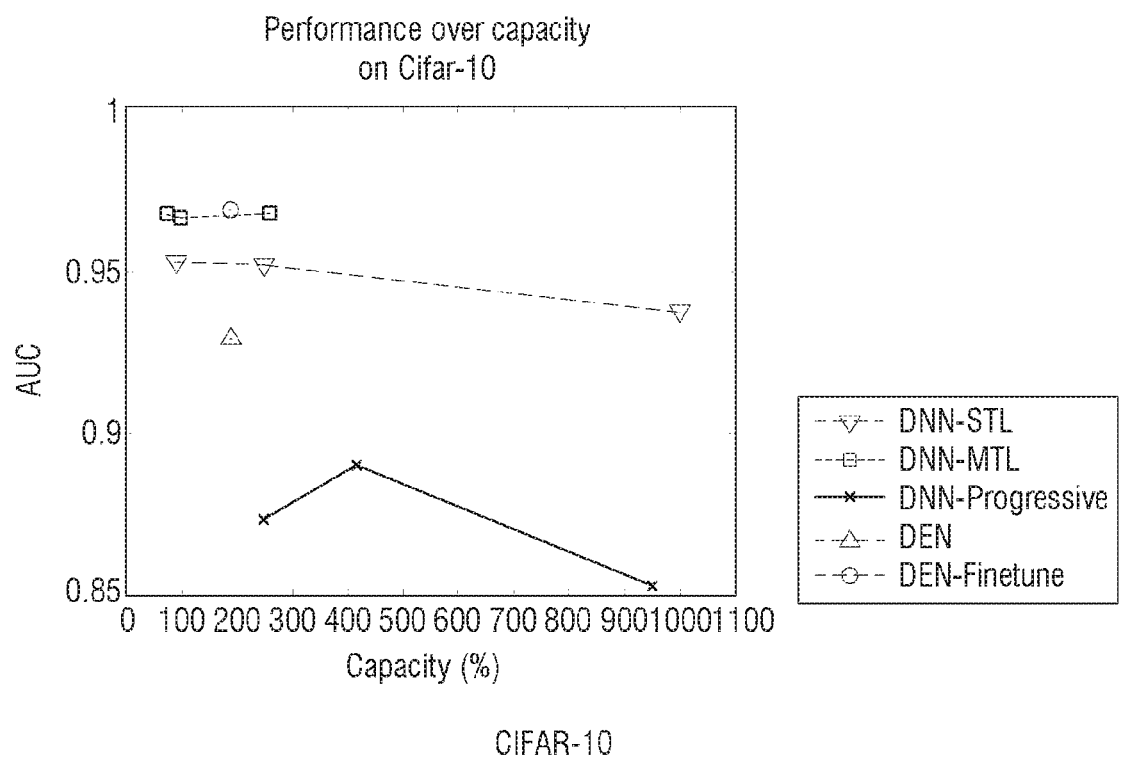
Figure 10C:
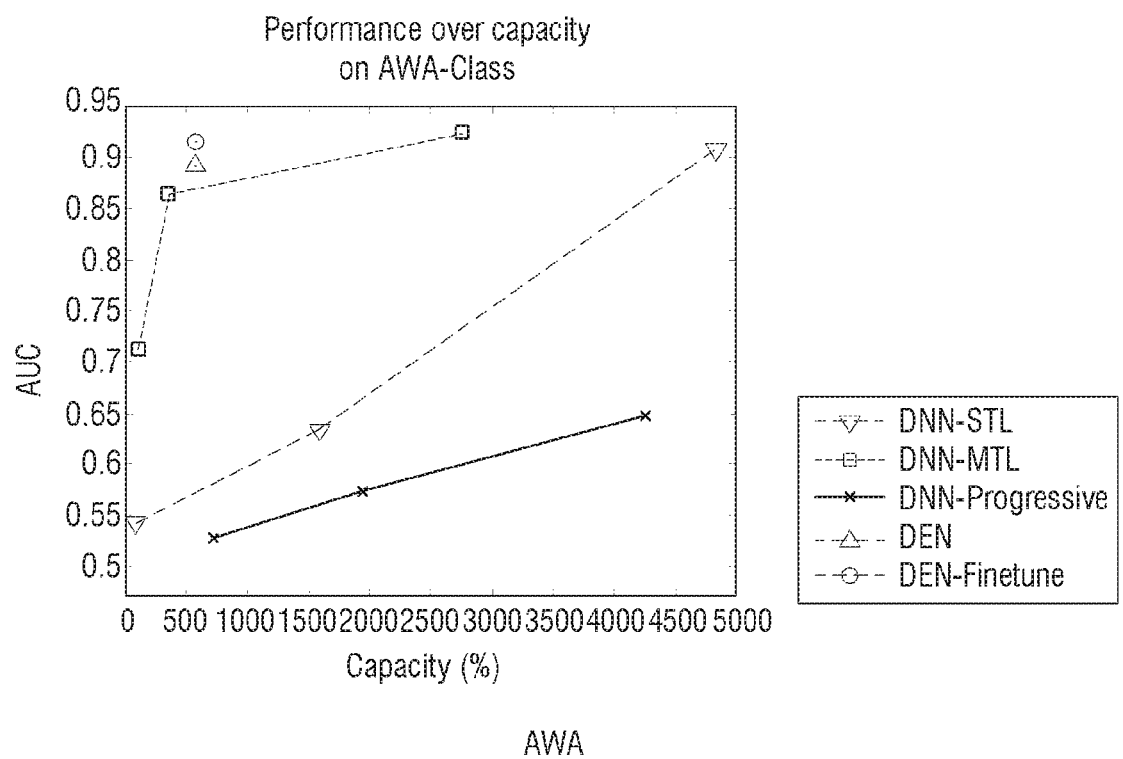
Figure 11A:
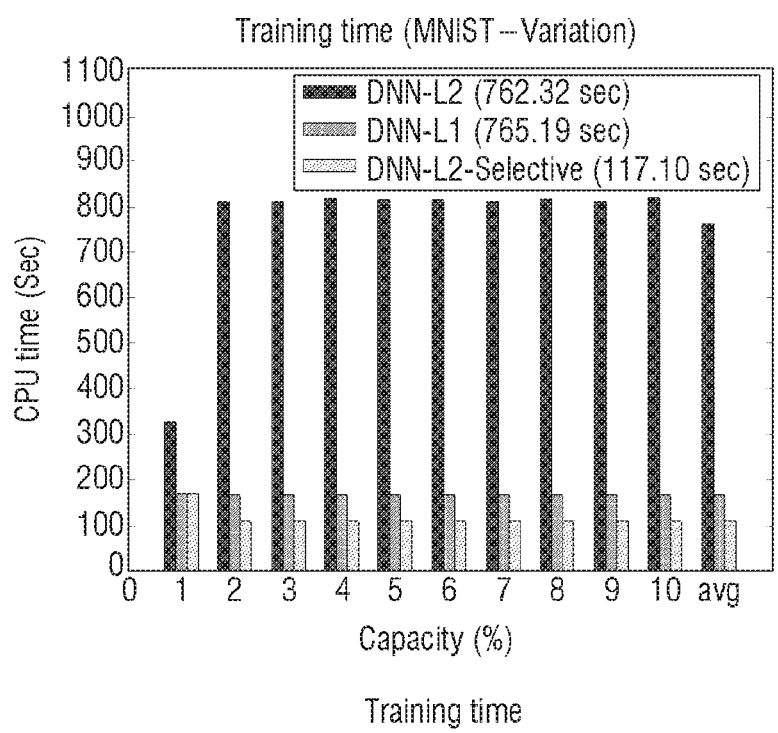
Figure 11B:
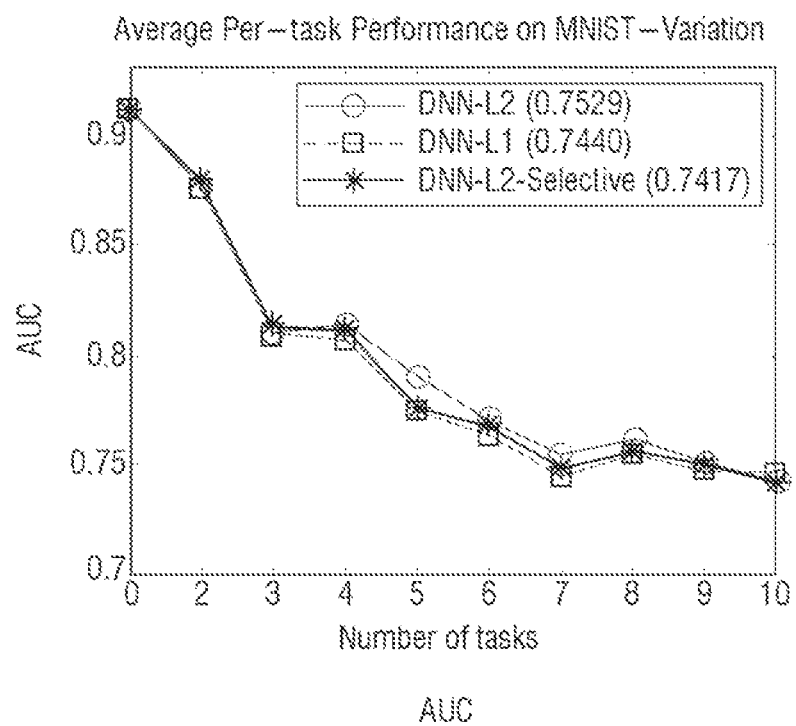
Figure 12A:
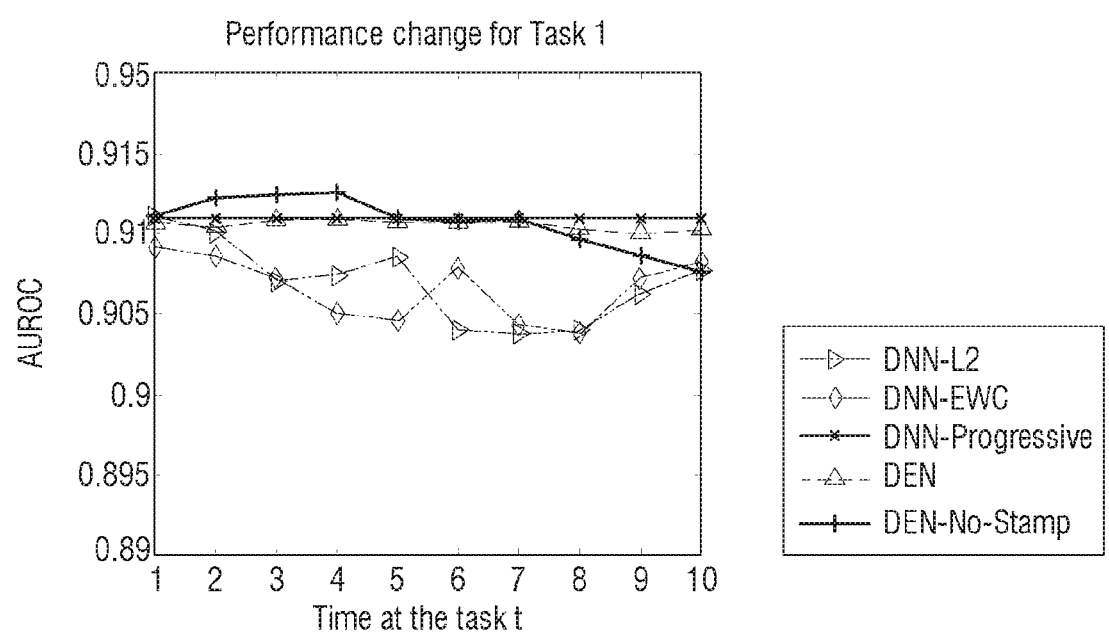
Figure 12B:
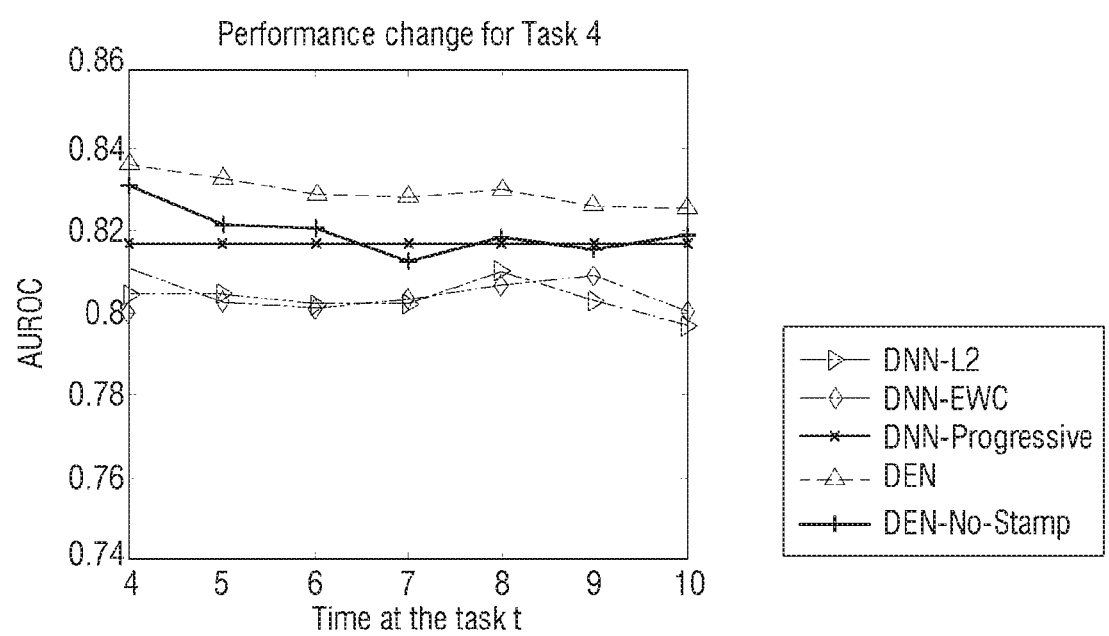
Figure 12C:
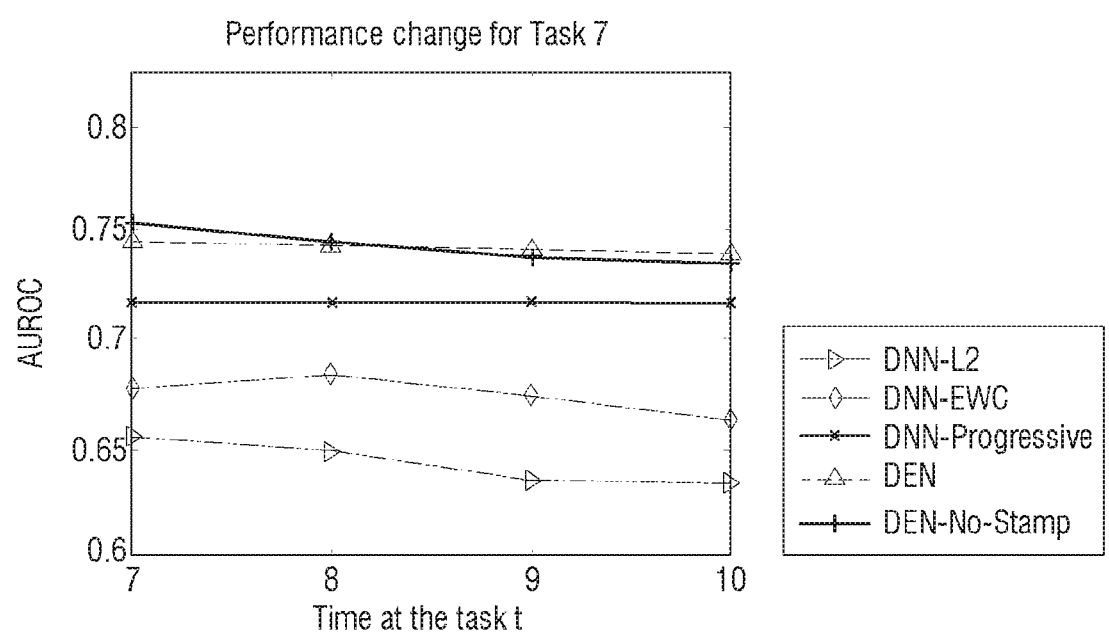
Figure 13:
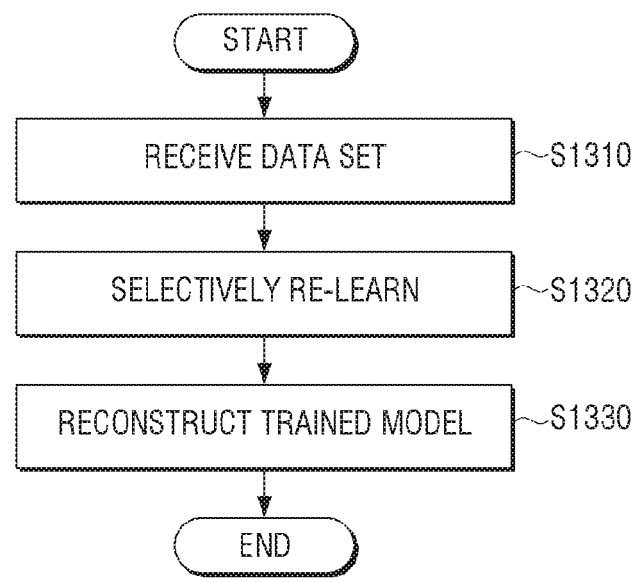
Figure 14:
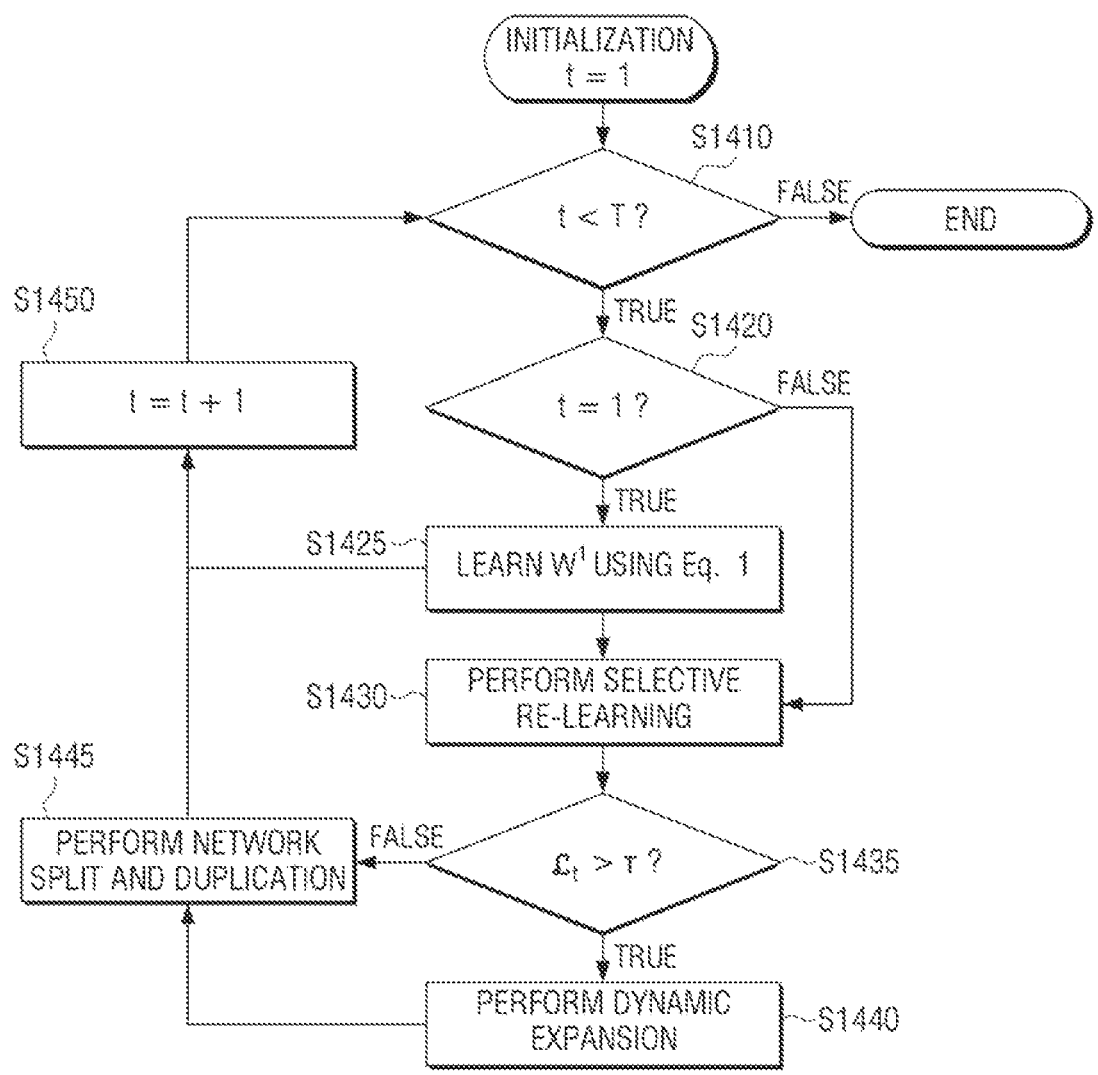
Figure 15:
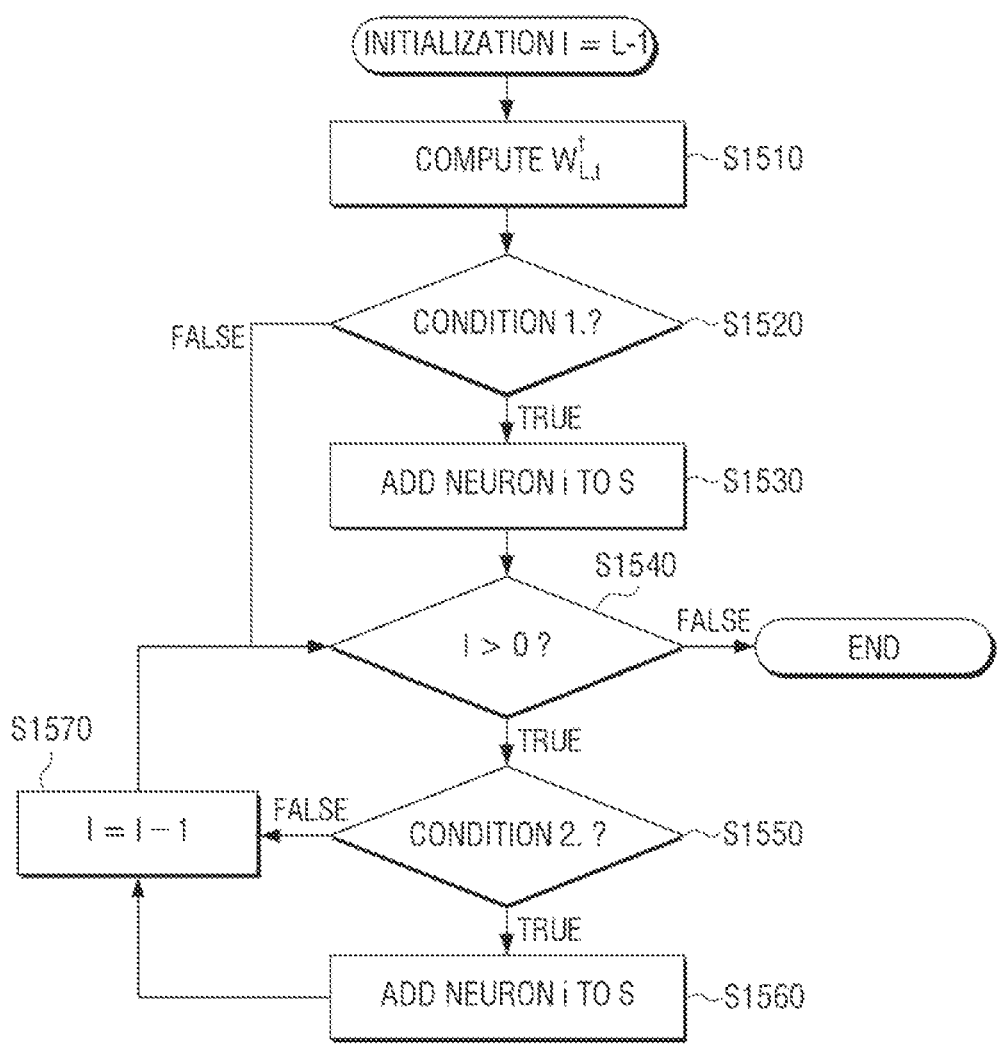
Figure 16:
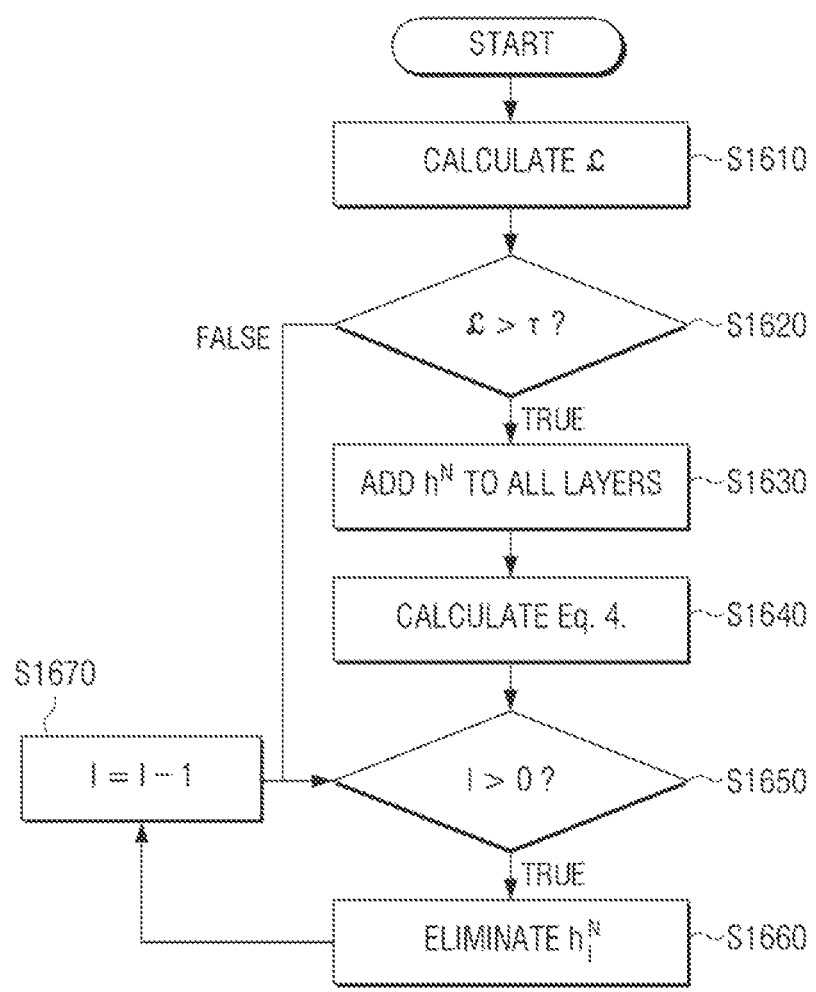
Figure 17:
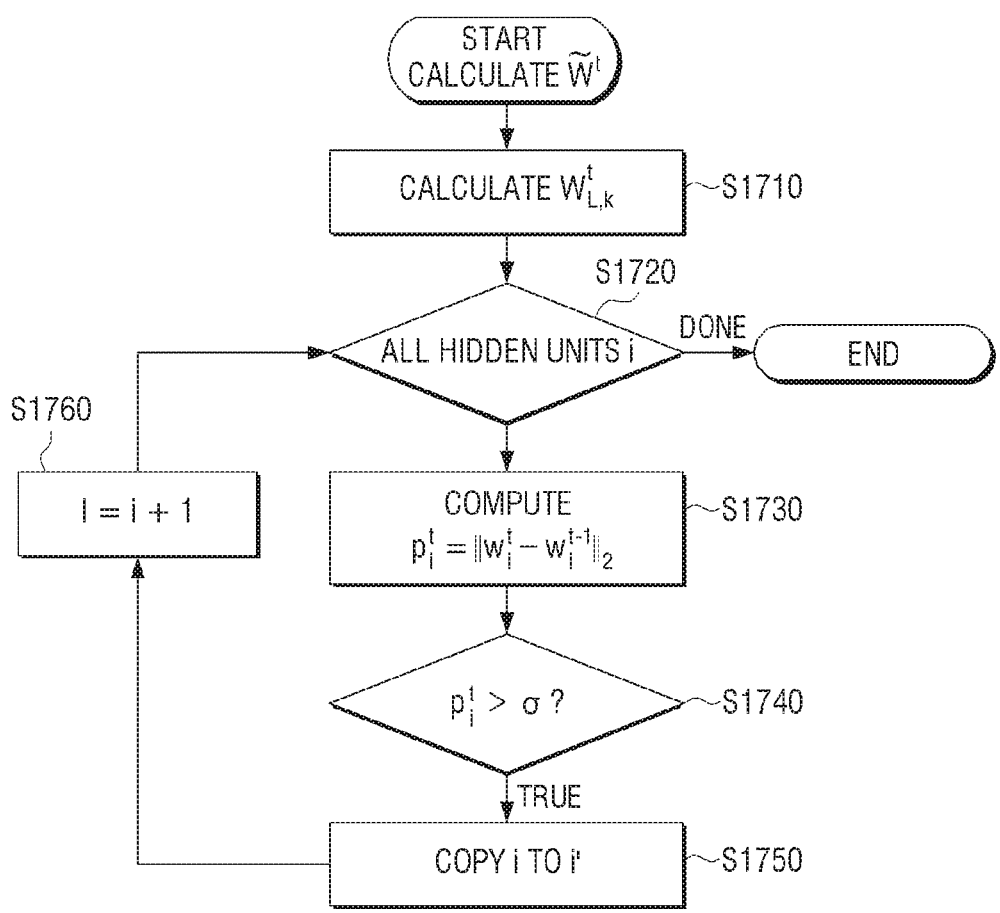

FIGS. 9A, 9B, and 9C are diagrams illustrating average per-task performance on each trained model and data set, respectively;

FIGS. 10A, 10B, and 10C are diagrams illustrating an accuracy of a size of a network for each trained model and data set, respectively;

FIGS. 11A, 11B, and 11C are diagrams illustrating an effect of selective retraining;

FIGS. 12A, 12B, and 12C are diagrams illustrating a semantic drift experiment on a MNIST-variation data set;

FIG. 13 is a flow chart for explaining a method for generating a trained model according to an exemplary embodiment of the present disclosure;

FIG. 14 is a flow chart for explaining incremental learning of a dynamically expandable network according to an embodiment of the present disclosure;

FIG. 15 is a flowchart for explaining a selective re-learning phase of FIG. 14;

FIG. 16 is a flowchart for explaining a dynamic network expansion step of FIG. 14; and FIG. 17 is a flowchart for explaining a network split and duplication step of FIG. 14.

DETAILED DESCRIPTION OF THE EXEMPLARY EMBODIMENTS

Terms used in the present specification are briefly described and then the present disclosure will be described in detail.

Terms used in embodiments of the present disclosure are selected as general terminologies currently widely used in consideration of the configuration and functions of the present disclosure, but can be different depending on intention of those skilled in the art, a precedent, appearance of new technologies, and the like. Further, in specific cases, terms arbitrarily selected by an applicant are present. In this case, the detailed meaning of the terms will be described in the description of the present disclosure. Therefore, terms used in the present disclosure are defined based on a meaning of the terms and contents described in the present disclosure, not simply based on names of the terms.

The embodiments of the present disclosure may be variously modified and have several forms. Therefore, specific embodiments of the present disclosure will be illustrated in the accompanying drawings and be described in detail in the present specification. However, it is to be understood that the present disclosure is not limited to a specific embodiment, but includes all modifications, equivalents, and substitutions without departing from the scope and spirit of the present disclosure. When it is decided that the detailed description of the known art related to the present disclosure may obscure the gist of the present disclosure, a detailed description therefor will be omitted.

Terms 'first', 'second', and the like, may be used to describe various components, but the components are not to be construed as being limited by the terms. The terms are used to distinguish one component from another component.

Singular forms are intended to include plural forms unless the context clearly indicates otherwise. It will be further understood that the terms "comprises" or "have" used in this specification, specify the presence of features, numerals, steps, operations, components, parts mentioned in this specification, or a combination thereof, but do not preclude the presence or addition of one or more other features, numerals, steps, operations, components, parts, or a combination thereof.

In the embodiments of the present disclosure, a 'module' or a 'unit' performs at least one function or operation and may be implemented by hardware or software or a combination of the hardware and the software. Further, a plurality of 'modules' or a plurality of 'units' are integrated into at least one module except for the 'module' or 'unit' which needs to be implemented by specific hardware and thus may be implemented by at least one processor.

Hereinafter, embodiments of the present disclosure will be described in detail with reference to the accompanying drawings so that those skilled in the art may easily practice the present disclosure. However, the present disclosure may be modified in various different ways and is not limited to embodiments provided in the present description. In the accompanying drawings, portions unrelated to the description will be omitted in order to obviously describe the present disclosure, and similar reference numerals will be used to describe similar portions throughout the present specification.

Hereinafter, exemplary embodiments of the present disclosure will be described in more detail with reference to the accompanying drawings.

Figure 1:
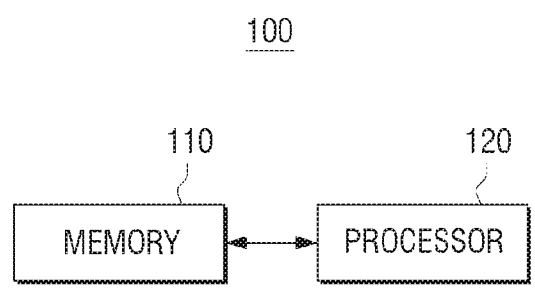
FIG. 1 is a block diagram illustrating a simple configuration of an electronic apparatus according to an embodiment of the present disclosure.

FIG. 1 is a block diagram illustrating a simple configuration of an electronic apparatus according to an embodiment of the present disclosure.

Referring to FIG. 1, an electronic apparatus 100 may include a memory 110 and a processor 120. Here, the electronic apparatus 100 may be a data computable PC, a notebook PC, a server, or the like.

The memory 110 stores a trained model consisting of a plurality of neurons. Here, the trained model is a model learned using artificial intelligence algorithms. The artificial intelligence algorithm may be a deep neural network (DNN), a deep convolution neural network, a residual network, or the like. The trained model may be composed of a plurality of layers, i.e., hierarchically.

The memory 110 may store a learning data set for re-learning the trained model, and may store data for classification or recognition using the corresponding trained model.

In addition, the memory 110 may store a program necessary for re-learning the trained model, or may store the trained model re-learned by the corresponding program.

The memory 110 may be implemented in a storage medium and an external storage medium in the electronic apparatus 100, for example, a removable disk including a USB memory, a storage medium connected to a host, a web server through a network, and the like.

The processor 120 controls each component of the electronic apparatus 100. Specifically, when a boot command is input from the user, the processor 120 may perform booting using an operating system stored in the memory 110.

The processor 120 may select a trained model to be re-learned through the manipulation input unit 140 which will be described later, and may receive various parameters for re-learning the selected trained model through the manipulation input unit 140. Here, the received various parameters may be hyper parameters or the like.

Upon receiving various information, the processor 120 identifies a neuron associated with a new task among a plurality of neurons. Specifically, the processor 120 may compute a new parameter matrix to minimize an objective function having a loss function for the input trained model and a regularization term for sparsity, and use the computed new parameter matrix to identify a neuron associated with the new task. Here, the objective function may be expressed by the following Equation 2 as a function having the loss function and the regularization term for sparsity. Specific contents of the objective function will be described later with reference to FIG. 3.

The processor 120 selectively re-learns parameters associated with a new task for the identified neuron. Specifically, the processor 120 may compute a new parameter matrix using a data set for a network parameter consisting of only the identified neuron so that an objective function as in the following Equation 3 to be described later is minimized, and reflect the computed new parameter matrix to the identified neuron of the trained model to perform the selective re-learning.

The processor 120 may selectively reconstruct the re-learned learning data. Specifically, if the trained model on which the selective re-learning is performed has a preset loss value, the processor 120 may dynamically expand the size of the trained model on which the selective re-learning is performed, thereby reconstructing the input trained model.

More specifically, if the trained model on which the selective re-learning is performed has a preset loss value, the processor 120 may add a fixed number of neurons for each layer to the trained model on which the selective re-learning is performed and use the group sparsity to eliminate unnecessary neurons from the added neurons, thereby reconstructing the input learning model. At this time, the processor 120 may identify unnecessary neurons among the added neurons by using an objective function as in the following Equation 4 having the loss function for the input trained model, the regularization term for sparsity, and the group regularization term for the group sparsity.

Alternatively, the processor 120 may compute the change in the neurons pre-identified by computing the following Equation (5) to be described later, duplicate the identified neurons if the change in the pre-identified neurons has a preset value to expand the input trained model, and allow the identified neurons to have the existing value, thereby reconstructing the input trained model.

The processor 120 may use the re-learned trained model to perform various processes such as vision recognition, speech recognition, and natural language processing. Specifically, if the trained model is related to image classification, the processor 120 may classify what the input image is based on the re-learned trained model and the input image.

As described above, the electronic apparatus 100 according to the present embodiment can re-learn only meaning neurons of the task rather than re-learning the entire weight when expanding the task, i.e., when performing the re-learning, thereby performing the efficient re-learning. In addition, when only the meaning neurons are re-learned, the semantic drift may be prevented.

Meanwhile, only the simple components configuring the electronic apparatus are illustrated and described, but in the implementation, various components may be additionally provided. This will be described below with reference to FIG. 2.

Figure 2:
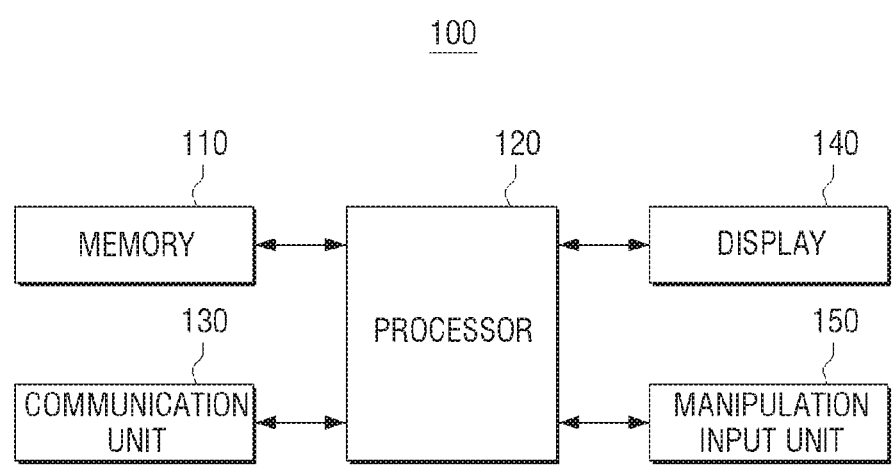
FIG. 2 is a block diagram illustrating a detailed configuration of the electronic apparatus according to the embodiment of the present disclosure.

FIG. 2 is a block diagram illustrating a detailed configuration of the electronic apparatus according to the embodiment of the present disclosure.

Referring to FIG. 2, the electronic apparatus 100 may include the memory 110, the processor 120, a communication unit 130, a display 140, and the manipulation input unit 150.

The operations of the memory 110 and the processor 120 have been described with reference to FIG. 1, and a redundant description thereof will be omitted.

The communication unit 130 is connected to other electronic apparatuses and may receive trained models and/or learning data from other electronic apparatus. Further, the communication unit 130 may receive information required for classification or evaluation, and may provide classification and evaluation results to other electronic apparatuses.

The communication unit 130 may be configured to connect the electronic apparatus 100 to an external device and can be connected to a terminal device through a local area network (LAN) and an Internet network as well as a universal serial bus (USB) port or wireless communication (for example, WiFi 802.11a/b/g/n, NFC, Bluetooth) ports.

The display 140 displays various kinds of information which is provided from the electronic apparatus 100. Specifically, the display 140 may display a user interface window for selecting various kinds of functions that the electronic apparatus 100 provides. Specifically, the corresponding user interface window may select the trained model for performing re-learning or may include an item for receiving parameters to be used for the re-learning process.

The display 140 may be a monitor such as an LCD, a CRT, and an OLED and may be implemented as a touch screen which may simultaneously perform a function of the manipulation input unit 150 to be described below.

In addition, the display 140 may display information on test results using the trained model. For example, if the corresponding trained model was a model for classifying images, the display 140 may display the classification results for the input images.

The manipulation input unit 150 may receive learning data to be re-learned from a user and various parameters to be performed in the re-learning process.

The manipulation input unit 150 may be implemented as a plurality of buttons, a keyboard, a mouse, and the like and may also be implemented as the touch screen which may simultaneously perform the function of the display 140 described above.

Meanwhile, illustrating and describing FIGS. 1 and 2, the electronic apparatus 100 includes only one processor. However, the electronic apparatus may include a plurality of processors, and a GPU in addition to a general CPU may be used. Specifically, the above-described optimization operation may be performed using a plurality of GPUs.

Hereinafter, a method of changing a trained model will be described in detail.

Lifelong learning is a field of previous learning. A main goal of the lifelong learning is to improve performance by using knowledge of previous tasks or to obtain faster convergence/learning speed in a model for next tasks.

There are various approaches to solve this problem. However, the present disclosure considers the lifelong learning is considered on deep learning to use the ability of the deep neural network. Fortunately, in the deep learning, storing or drifting knowledge may be performed in a simple way through the learned network weights. The learned weights may be provided as the knowledge of the existing tasks, and new tasks may exert their influence only by sharing their weights.

Therefore, the lifelong learning may be regarded as a special case of online learning or incremental learning in the deep neural network.

There are various ways to perform incremental learning. The simplest way is to gradually fine tune the network using new tasks by continuously learning the network with new learning data.

However, simply re-learning the network may have degraded performance in both new and previous tasks. If the new task is very different from the previous task, for example, if the previous task is to classify an image of an animal and the new task is to classify an image of a car, feature learning of the previous task is not useful for learning the new task. At the same time, the re-learning for the new task deviates from the original task and therefore is no longer an optimal task, which negatively affects the existing task.

For example, a feature describing a striped pattern of a zebra may change a feature like being changed to a meaning for an acquired classification task that classifies a striped T-shirt or a fence and may greatly change even a meaning thereof.

Accordingly, we considered how to ensure that the sharing of the knowledge through the network in the online/incremental learning of the deep neural network is beneficial to all tasks. Recently, tasks have proposed the use of regularization to prevent parameters from being greatly changed. However, the proposal has to find a good solution to the new task and prevent the change in parameters of the old task.

Therefore, in the present disclosure, the network is learned in each task t for the new task utilization while permitting expansion of the size of the network, if necessary, and only the corresponding part in the previous learning network is changed. In this way, each task t may be used as a sub-network different from the previous task, and may share a significant portion of the sub-network associated therewith.

On the other hand, the following matters should be considered in order to gradually establish the deep learning through the selective parameter sharing and the dynamic layer expansion.

1) Achievement of expansibility and efficiency of learning: If the size of the network increases, the connection to a much larger network is set through subsequent tasks, so the learning cost per task gradually increases. Therefore, a method for keeping a computational overhead of retraining low is required.

2) Determination on timing to expand network and the number of neurons to be added: If the existing network fully explains the new task, there is no need to expand a size of the network. Conversely, if the task is very different from the existing task, there is a need to add many neurons. Therefore, the trained model needs to dynamically add only the necessary number of neurons.

3) There is a need to prevent catastrophic forgetting, which degrades performance on semantic drift or initial example/task that are out of an initial configuration of the network. In this regard, since the network is partially re-learned and is adapted to the task learned later and the connection to the previous sub-network is established to add a new neuron which may have a negative effect on the previous task, a mechanism for preventing latent meaning movement of the semantic drift is required.

To address this, the present disclosure proposes a new-dimension network model along with efficient incremental learning algorithms. This algorithm is called dynamically expandable networks (DEN).

In the lifelong learning scenarios, the DEN may dynamically increase the size of the network by adding or splitting neurons when necessary simultaneously with efficiently learning a method for predicting a new task by maximally using the network learned from all previous tasks. The algorithm can be applied to a general network including a convolution network.

Hereinafter, the conventional lifelong learning method and a learning method according to the present embodiment will be described with reference to FIG. 3.

Figure 3:
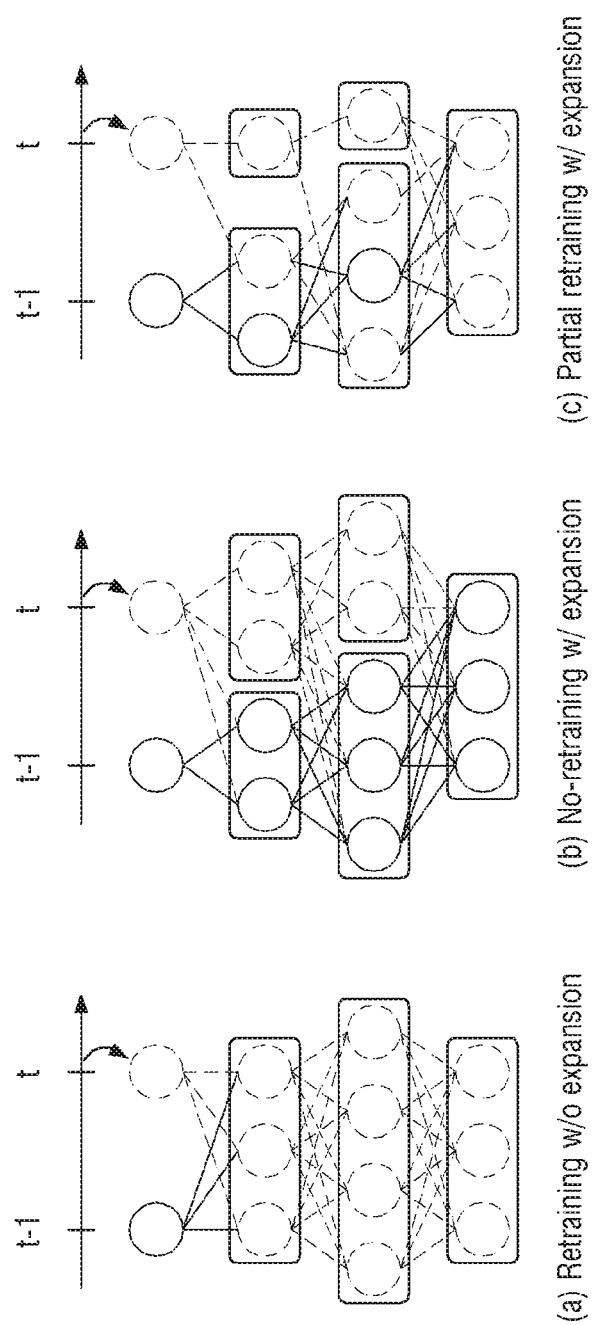
FIG. 3 is a diagram for explaining a dynamic expansion method.

FIG. 3 is a diagram for explaining various re-learning models.

FIG. 3A illustrates a retrained model such as elastic weight consolidation. The corresponding model is a way to re-learn the entire network learned about the previous task while performing regularization to prevent the large difference from the original model. The re-learned units and weights are indicated by dotted lines, and the fixed units and weights are indicated by a solid line.

FIG. 3B illustrates a non-training model such as a progressive network. The corresponding model expands the network for a new task t while maintaining the network weight for the existing task.

FIG. 3C illustrates the trained model according to the present disclosure. The trained model according to the present disclosure selectively re-learns the existing network to expand the size if necessary, thereby dynamically determining the optimal size upon learning.

Hereinafter, the dynamically expandable network incremental learning according to the present disclosure will be described.

The lifelong learning scenario in which the number of unknown tasks having unknown distributions of learning data sequentially reaches the model considers the incremental training problem of the deep neural network. Specifically, the model for successive T tasks (t=1, t, T, T is infinity) is learned. Here, the task depends on the learning data $$\left(\mathcal{D}_t = \{x_i, y_i\}_{i=1}^{N_t}\right)$$

at a specific time t.

For simplicity, the method for generalization of a particular task may take into account binary classification tasks having y∈{0, 1} for input feature (x∈$\mathbb{R}^d$). The main task is that the previous training data set up to t−1 in the lifelong learning environment is not available at the current time t. Only model parameters for previous task are accessible.

At the time t, the lifelong learning agent aims to learn a model parameter $W^t$ by solving the following equations.

$$\underset{W^t}{\text{minimize}}\ \mathcal{L}(W^t; W^{t-1}, \mathcal{D}_t) + \lambda\Omega(W^t),\ t = 1, \ldots$$

Here, $\mathcal{L}$ represents a specific task loss function, $W^t$ represents the parameter for the task t, and $\Omega(W^t)$ represents regularization (e.g., element-wise $l_2$ norm) for appropriately performing the model $W^t$. L (l=1, 2, . . . , L) represents the number of layers and D represents data, a weight tensor for t at a $W_i^t{:}l^{th}$ layer.

To solve these tasks of the lifelong learning, the network may maximally use the knowledge obtained from the previous tasks and allow the size to be dynamically expanded when only the cumulative knowledge cannot adequately account for new tasks. Specifically, the optimal solution may be found by dynamically adjusting the size of the network. That is, when the additional learning is performed based on the already pre-learned network model, the learning is not performed again on the whole, but only the additional part is learned by duplicating and splitting the network in the corresponding task unit to save the learning time and the computation.

Hereinafter, the incremental learning process will be described with reference to FIGS. 4 and 5.

Figure 4:
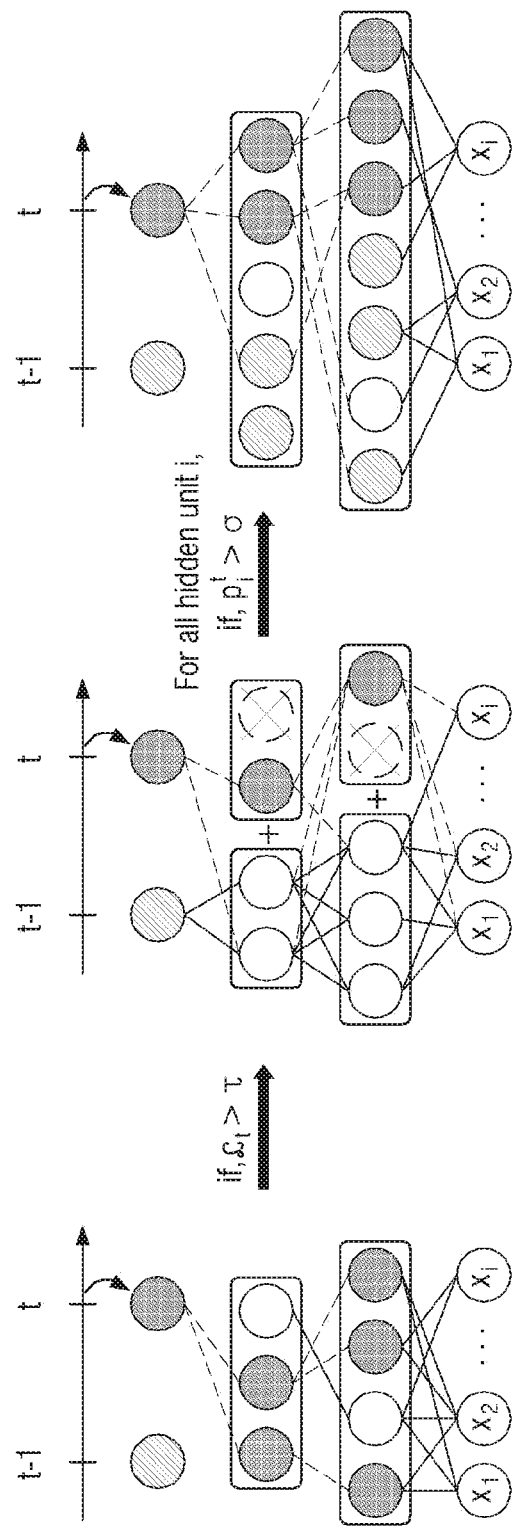
FIG. 4 is a diagram for explaining contents of incremental learning in a dynamically expandable network.

FIG. 4 is a diagram for explaining contents of incremental learning in a dynamically expandable network and FIG. 5 is a diagram illustrating an incremental learning algorithm in the dynamically expandable network.

Referring to FIGS. 4 and 5, first of all, the selective re-learning is performed. Specifically, it identifies neurons associated with a new task and selectively re-learns network parameters associated with the related task. The specific operation of the selective re-learning will be described later with reference to FIG. 6.

The network is dynamically expanded. Specifically, if the selective retraining does not obtain the desired loss equal to or less than a set threshold, group-sparsity regularization is used to expand the size of the network in a top-down manner while eliminating all unnecessary neurons. The dynamically expandable operation will be described later with reference to FIG. 7.

The network is split or duplicated. Specifically, the DEN computes drifts $p_i^t$ for each unit to identify and duplicate units that deviate too much from their original values during the training. The specific operation of the split and duplication of the network will be described later with reference to FIG. 8.

Hereinafter, the selective re-learning operation will be described with reference to FIG. 6.

FIG. 6 is a diagram illustrating the selective re-learning algorithm.

The simplest way to train a model for a series of tasks is to re-learn the entire model each time a new task arrives. However, the retraining may be costly for the deep neural networks. Therefore, it is preferable to perform the selective re-learning of the model by re-learning only the weight that is influenced by the new task. Accordingly, in the present disclosure, to accelerate the sparsity of the weight, the network is learned by $l_1$ regularization. As a result, each neuron is connected to only a few neurons in the low layer.

$$\underset{W^t}{\text{minimize}}\ \mathcal{L}(W^t; W^{t-1}, \mathcal{D}_t) + \mu\sum_{l=1}^{L}\|W_l^t\|_1 \qquad \text{[Equation 1]}$$

In the above Equation 1, 1≤l≤L represents a $l_{th}$ layer of the network, $W_i^t$ represents the network parameter at the layer l, μ represents the regularization parameter of the element-wise $l_1$ norm for the sparsity of w and is used to define a size of the regularize when the regularize is added. In the convolution layer, only the filter of the previous layer was selected by applying (2,1)-nom on the filter.

$l_1$-regularization may greatly reduce the computational overhead if we may concentrate on a sub-network connection new task since the connectivity between neurons is sparse. To this end, if the new task arrives at the model, it is suitable for a sparse linear model for predicting task t by using the highest hidden unit of the neural network by the following Equation 2.

$$\underset{W_{L,t}^t}{\text{minimize}}\ \mathcal{L}\!\left(W_{L,t}^t; W_{1:L-1}^{t-1}, \mathcal{D}_t\right) + \mu\|W_{L,t}^t\|_1 \qquad \text{[Equation 2]}$$

In the above Equation 2, $W_{1:L-1}^{t-1}$ represents a set of all other parameters other than $W_{L,t}^t$ That is, to solve the optimization, the connection between the output unit $O_t$ and the hidden layer at the layer L−1 is obtained (all other parameters up to the layer L−1 is fixed as $W^{t-1}$). The units and the weights within the network affected by the learning may be identified by constructing the sparse connection at the layer. In particular, it is possible to identify all units (and input features) having a path by performing a breadth-first search in the network, starting at the selected node. Next, only the weights of the selected sub-network $S(W_S^t)$ may be learned.

$$\underset{W_S^t}{\text{minimize}} \; \mathcal{L}(W_S^t; W_S^{t-1}, \mathcal{D}_t) + \mu \|W_S^t\|_2 \quad \text{[Equation 3]}$$

The element-wise $l_2$ regularization is used because the sparse connection is already established. This selective re-learning helps to reduce computational overhead and avoid negative drift because unselected neurons are not affected by the re-learning.

Referring to FIG. 6, first of all, l and S are initialized, and $W_{L,t}^t$ is obtained by the above Equation 2.

Then, if the weight between i and $O_t$ of the weight $W_{L,t}^t$ for the task t at the layer L is not zero, neuron I is added to S.

In addition, when there is the neuron S which is j ∈ S and $W_{l,ij}^{t-1} \neq 0$ the neuron i is added to the S.

Then, $W_S^t$ is obtained by the above Equation 3.

FIG. 7 is a diagram illustrating an algorithm for the dynamically expandable method.

If the new task is highly associated with the previous task or the partially obtained knowledge which is obtained from each task is sufficient to explain the new task, the selective retraining alone is sufficient to perform the new task.

However, if the learned feature is not sufficient to represent the new task, additional neurons should be introduced into the network to illustrate the function necessary for the new task. On the other hand, it is not desirable to add a certain number of units or to request a repetitive forward path without considering the task difficulty, in terms of the performance and the size of the network.

Therefore, the present disclosure uses group sparse regularization to dynamically determine how many neurons should be added to each layer. Assuming that the layer of the network is expanded to a certain number (k), the two parameter matrices can be expanded as $W_l^t = [W_l^{t-1} j \; W_l^N]$ $W_{l-1}^t = [W_{l-1}^{i-1}; W_{l-1}^N]$, Since we do not want to always add k units depending on the relevance between the new task and the previous task, we perform group sparse regularization on the added parameters as in the following Equation 4.

$$\underset{W_l^N}{\text{minimize}} \; \mathcal{L}(W_l^N; W_l^{t-1}, \mathcal{D}_t) + \mu \|W_l^N\|_1 + \gamma \sum_g \|W_{l,g}^N\|_2 \quad \text{[Equation 4]}$$

In the above Equation 4, g ∈ $\mathcal{G}$ represents a group defined as the inflow weights for each neuron. The convolution layer defines each group as an activation map of each convolution filter. This group sparse regularization finds the proper number of neurons in the entire network, and in this disclosure, is applied only in some networks. FIG. 7 illustrates this algorithm.

Referring to FIG. 7, if a loss value ($\mathcal{L}$) targeted in the selective re-learning is larger than the preset loss value ($\mathcal{T}$), the size of the network is fixedly expanded and an operation of eliminating unnecessary neurons out of neurons expanded through the group sparsity may be performed repeatedly.

FIG. 8 is a diagram illustrating the algorithm for the network split and duplication.

An important problem in the lifelong learning is the semantic drift, the catastrophic forgetting which forgets the initial task by the task learned later to degrade the performance. An easy way to avoid the semantic drift is to regularize the parameters so that the parameters do not deviate too much from their original values using $l_2$-regularization.

$$\underset{W^t}{\min} \mathcal{L}(W^t; \mathcal{D}_t) + \lambda \|W^t - W^{t-1}\|_2^2 \quad \text{[Equation 5]}$$

In the above Equation 5, t represents the current task and $w_l^{t-1}$ represents the weighted tensor of the trained network for the l task {1, . . . , i−1}. λ represents the regularization parameter.

The $l_2$ regularization forces the solution $W^t$ to approach $W^{t-1}$ based on the given λ. If λ is small, the network will learn to further reflect the new task while forgetting the old task, and if λ is large, $W^t$ will try to preserve the knowledge learned from the previous task as much as possible.

Instead of the $l_2$ regularization, it is also possible to weight each element using Fisher information. Nevertheless, if the number of tasks is very large or the latter task is semantically different from the previous task, it becomes difficult to find a good solution for each of the previous and new tasks.

In this case, a good way is to split the two different optimized tasks. By performing the above Equation 5, the amount $\rho_i^t$ of semantic drift at each hidden layer is measured based on the $l_2$ distance between the weights input t−1 and t.

If $\rho_i^t > \sigma$, since we may think that the meaning of the features is greatly changed during the training, the neuron is divided into two carbon copies. This way may be performed in parallel for all hidden neurons. After the neuron is duplicated, the neuron may re-learn the weights by using the above Equation 5. However, the second learning may be quickly performed based on the reasonable parameter initialization from the initialization learning. FIG. 8 illustrates this algorithm.

Referring to FIG. 8, if the change in the updated neuron is higher than the reference point after the previous dynamic network expansion operation, the network is expanded by duplicating the corresponding neurons B, and the updated neuron B may return to the previous step A.

On the other hand, it is possible to effectively prevent a semantic deviation due to the introduction of the new concept by setting $\{z\}_j = t$ storing the learning phase t when being added to the network in both the network expansion and network split procedure to process a timestamp on a newly added unit j.

Specifically, at the time of inference, each task may use only the parameters introduced up to the step t not to use the new hidden unit added to the learning process in the previous step. This is more flexible than modifying the weights learned up to each learning phase. There is an advantage in that the initial learning problem may be learned in the following learning problem but the learning may be performed better but is not split.

Hereinafter, the effect of the selective re-learning method according to the present disclosure will be described with reference to FIGS. 9 to 12.

Hereinafter, the comparison object of the experiment conditions applied to the selective re-learning method according to the present disclosure and the setting state therefor will be preferentially described.

1) DNN-STL (Single-Task Learning): Base deep neural network individually trained for each task.

2) DNN-MTL (Multi-Task Learning): Base deep neural network learned for all tasks at once.
3) DNN-L2: Base deep neural network, where Wt at each task t is initialized to $W^{t-1}$ and continues to be trained with SGD and $W^t$ is trained with $l_2$-regularized SGD.
4) DNN-EWC: Deep network trained with elastic weight enhancement for refinement.
5) DNN-progressive: Progressive network fixed for task at which network weights for each task arrive later.
6) DEN. Learning method of the present disclosure
Base Network Settings.

1) Feedforward network: 2 layer networks each having 312-128 ReLU activations is used, and 0.1 is used as λ for regularization of $W^{t-1}$. The sparsity μ of the above Equation 2 is set to be $10^5$. K=10 is used as the number of units to be added to each task, the group-sparsity regularization term γ in the above Equation 4 is set to be 0.01, and σ=0.005 is set as 12 distance threshold in the network split and duplication.

2) Convolution network: LeNet having two convolution layers and three complete connection layers is used. Here, 0.01 is used as λ for 12 regularization, $\mu=1e^{-6}$ is used for sparsity, and γ=0.8 is used for the group sparsity. For σ for the network split and duplication, $\sigma_c=0.02$, $\sigma_f=0.002$ are each set for the convolution layer and the complete connection layer.

All models and algorithms are implemented using the Tensorflow library. The data sets used will be described below.

1) MNIST-Variation. This data set consists of 62000 images consisting of autograph digit numbers from 0 to 9.
2) CIFAR-10. This data set consists of 60000 images of common objects, including vehicles and animals. Each class has 6000 32×32 images, in which 5000 images is used for the learning and the rest is used for the testing.
3) AWE. This data set consists of 30475 images of 50 animals.

Hereinafter, the quantitative evaluation using the above-described model and data set will be described. Specifically, the model for both prediction accuracy and efficiency is verified.

FIG. 9 is a diagram illustrating average per-task performance on each trained model and data set, respectively. Specifically, FIG. 9A is a diagram illustrating the number of tasks for each model for the MNIST-Variation data set, FIG. 9B is a diagram illustrating the number of tasks for each model for the CIFAR-10 data set, and FIG. 9C is a diagram illustrating the number of task for each model for the AWA data set.

Referring to FIG. 9, it may be confirmed that the CNN-MTL and the DNN-STL each have the best performance in the CIFAR-10 and the AWA. It is expected to have the good actual performance because it is trained to perform all tasks at once or is best suited for each task.

On the other hand, other models may be trained online to cause semantic drift. If the number of tasks is small, the MTL works best in the knowledge sharing through the multi-task learning, but if the number of tasks is large, the STL works better because it is larger in learning size than the MTL.

The DEN has almost the same performance as the other models and may be seen to be superior to performance of others in the data sets such as the MNIST-Variation.

It may be confirmed that the retrained model combined with regularization such as L2 and EWC is not relatively performed well in all data sets.

The progressive network works better than both, but in the AWA, the performance is significantly worse. This is because it may be difficult to find the appropriate size of the network due to a large number of tasks. If the network is too small, it does not have enough learning ability to represent the new task, and if the network is too large, it tends to be excessive.

Referring to FIG. 9, it may be confirmed that even if the DEN according to the present disclosure is the lifelong learning method, the DEN has the performance approximating the independent learning (STL) or the simultaneous learning (MTL) or has more excellent results when learning the new concept.

FIG. 10 is a diagram illustrating a performance difference due to the size of the network. Specifically, FIG. 10A is a diagram illustrating the size of the network for each trained model in the MNIST-Variation data set, FIG. 10B is a diagram illustrating the size of the network for each trained model in the CIFAR-10 data set, and FIG. 10C is a diagram illustrating the size of the network for each trained model in the AWA data set.

Referring to FIG. 10, it may be confirmed that the DEN according to the present disclosure achieves far better performance with far fewer parameters than the progressive network, or has much better performance with a similar number of parameters. The DEN may obtain the same level of performance as the STL using a size of 18.0%, 19.1% and 11:9% in the MNIST-Variation, the Cigar-10, and the AWA, respectively.

A major benefit of the DEN can dynamically find the optimal size because the DEN learns a very compact model in the MNIST-Variation while learning a substantially large network in the AWA. The DEN fine-tuning for all tasks (DEN-Finetune) obtains the best performance model from all data sets. The DEN is not only useful for the lifelong learning, but may also be used to predict the size of the network when all tasks exist. It may be used in the first place.

In addition, it may be confirmed that the best performance is achieved in all data sets when the re-learning is performed using the size of the learned network. In this way, it may be confirmed that when the trained model according to the present disclosure learns not only in the lifelong learning scenario but also learns a plurality of tasks at a time from the beginning, similarly, it may be used to estimate the size of the network performing the learning.

FIG. 11 is a diagram illustrating the effect of the selective retraining. Specifically, FIG. 11A is a diagram illustrating processing time by size, FIG. 11B is a diagram illustrating an AUC, and FIG. 11C is a diagram illustrating an expansion performance.

We examined how efficient the selective learning is by measuring the learning speed and accuracy for each task in the MNIST-Variation data set. To this end, we compared DNN-L2 with a network expansion-free model called DNN-Selective.

Referring to FIGS. 11A and 11B, it may be confirmed that the DNN-Selective obtains a slight reduction in accuracy compared to the entire network but achieves the speed up of 6:51 times, such that it may be confirmed that the selective re-learning is much more efficient than the entire re-learning of the network.

Referring to FIG. 11C, it may be confirmed that DNN-L1 also exerts better performance than the entire network trained without sparse regularization. The reason is that the sparse network eliminates much of the computation for forward and backward passes. However, the DNN-selective is not effective.

Hereinafter, the effects of the network expansion will be described with reference to FIG. 12.

FIG. 12 is a diagram illustrating the semantic drift experiment on the MNIST-Variation data set. Specifically, FIG. 12A illustrates the learning time for each task measured in CPU time, FIG. 12B illustrates average per-task performance of the compared model, and FIG. 12C illustrates the expansion performance.

The selective retraining and the layer expansion are performed, but the variation of the model in which the network is split and the efficiency of the network expansion are compared with the model.

DNN-Dynamic obtains much better average AUC than all models including DNN-Constant, but significantly increases the size of the network over the DNN-Constant. The reason is that if the number of parameters is reduced, it is beneficial not only in terms of the learning efficiency, but also prevents the model from being over-applied.

FIG. 12 illustrates how the performance of the model changes at each learning phase t for tasks t=1, t=4, and t=7.

The DNN-L2 prevents the semantic drift of the learned model in the initial stage, but it may be confirmed that the performance gradually deteriorates in the task (t=4, 7).

This is a common phenomenon even in the DNN-EWC. As a result, each task may require significantly different function than the previous task. MNIST-Variation data set. The DNN-Progressive shows that there is no semantic drift for the previous task, and is expected because the parameters are not input to the previous task again.

On the other hand, the timestamping is more effective than the DNN-Progressive in subsequent tasks with slight performance degradation over time. Finally, it may be confirmed that the entire model of the timestamped DEN does not show a sign of the performance degradation during the learning phase, but is far superior to the DNN-progressive.

This result indicates that the DEN is very effective in preventing the semantic drift.

When the learning is progressed in the lifelong learning scenario, reviewing the performance change trend for each task, in the case of the existing technology (EWC), the performance tends to be degraded due to the semantic drift phenomenon as the number of objects to be learned is increased, whereas in the case of the progressive which is the existing technology, since the existing learned network is fixed and the network is linearly expanded each time the number of objects to be learned is increased, the performance is maintained but the computation time is exponentially increased as the expansion of the network. Since the technology is designed to maintain the certain performance through a series of processes such as the selective expansion, the split, and the re-learning of the network, the network can be efficiently expanded, thereby minimizing the increase range in computation time.

FIG. 13 is a flow chart for explaining a method for re-learning a trained model according to an exemplary embodiment of the present disclosure.

A data set including a trained model consisting of a plurality of neurons and a new task is received (S1310).

A neuron associated with the new task among a plurality of neurons is identified, and a parameter associated with the new task is selectively re-learned for the identified neuron (S1320). Specifically, a new parameter matrix is computed to minimize a loss function for the input trained model and an objective function having a regularization term for sparsity, and the neuron associated with the new task is identified using the computed new parameter matrix. The new parameter matrix is calculated using the data set for the network parameter consisting of only the identified neuron, and the computed new parameter matrix is reflected to the identified neuron of the trained model to perform the selective re-learning.

If the trained model on which the selective re-learning is performed has a preset loss value, the size of the learning model on which the selective re-learning is performed is dynamically expanded to reconstruct the input learning model (S1330). Specifically, if the trained model on which the selective re-learning is performed has a preset loss value, the fixed number of neurons for each layer is added to the trained model on which the selective re-learning is performed and the group sparsity is used to eliminate unnecessary neurons from the added neurons, thereby reconstructing the input trained model.

Alternatively, if the change in the identified neuron has a preset value, the identified neuron may be duplicated to expand the input trained model, and the identified neuron may have an existing value to reconstruct the input trained model.

Therefore, the method for re-learning a trained model according to the present embodiment can re-learn only the meaning neurons of the task rather than re-learning the entire weight when expanding the task, i.e., when performing the re-learning, thereby performing the efficient re-learning. In addition, when only the meaning neurons are re-learned, the semantic drift may be prevented. The method for re-learning a trained model as illustrated in FIG. 13 may be executed on the electronic apparatus having the configuration of FIG. 1 or FIG. 2, or may be performed on an electronic apparatus having another configuration.

Further, the method for re-learning a trained model as described above may be implemented in programs including algorithm which may be executed in a computer and the programs may be provided while being stored in a non-transitory computer readable medium.

The non-transitory computer readable medium is not a medium that stores data therein for a while, such as a register, a cache, a memory, or the like, but means a medium that semi-permanently stores data therein and is readable by a device. In detail, programs for performing various methods described above may be stored and provided in the non-transitory computer readable medium such as a compact disk (CD), a digital versatile disk (DVD), a hard disk, a Blu-ray disk, a universal serial bus (USB), a memory card, and a read only memory (ROM).

FIG. 14 is a flow chart for explaining incremental learning of a dynamically expandable network according to an embodiment of the present disclosure.

Referring to FIG. 14, first of all, t is initialized to 1.

If t is smaller than T (S1410-Y) and t is 1 (S1420-Y), W1 is learned using the above Equation 1 (S1425).

Then, the selective re-learning is performed (S1430). Specifically, it is possible to identify neurons associated with a new task and selectively re-learn network parameters associated with the task. The specific operation of the selective re-learning will be described later with reference to FIG. 15.

It is confirmed whether the loss value of the trained model in which the selective re-learning is performed has the preset loss value (S1435).

If the loss value of the trained model has the preset loss value (S1435-Y) and the selective retraining does not obtain the desired loss equal to or less than the set threshold value, the group-sparsity regularization is used to expand the size of the network in the top-down manner while eliminating unnecessary all neurons. The dynamically expandable operation will be described later with reference to FIG. 16.

If the change in the identified neuron has the preset value, the network is split or duplicated (S1445). Specifically, the DEN may compute drifts for each unit to identify and duplicate units that deviate too much from their original values during the training. The specific operation of the split and duplication of the network will be described later with reference to FIG. 17.

Thereafter, the t value is increased (S1450), and the above phases are repeated until T is reached.

Therefore, the incremental learning according to the present embodiment is performed by re-learning only the meaning neurons of the task rather than re-learning the entire weights when expanding the task, i.e., when performing the re-learning, thereby performing the efficient re-learning. In addition, when only the meaning neurons are re-learned, the semantic drift may be prevented. The incremental learning as illustrated in FIG. 14 may be executed on the electronic apparatus having the configuration of FIG. 1 or FIG. 2, and may be performed on an electronic apparatus having another configuration.

Further, the incremental learning as described above may be implemented in programs including algorithm which may be executed in a computer and the programs may be provided while being stored in a non-transitory computer readable medium.

FIG. 15 is a flowchart for explaining a selective re-learning phase of FIG. 14.

Referring to FIG. 15, l and S are initialized, and $W_{L,t}^{t}$ is calculated by the above Equation 2 (S1510).

Then, if the weight between i and $0_t$ of the weight $W_{L,t}^{t}$ for the task t at the layer L is not zero (S1520), the corresponding neuron i is added to S (S1530).

Thereafter, when the layer is larger than 0 (S1540), and there is the neuron S which is $j \in S$ and $W_{l,ij}^{t-1} \neq 0$ (S1550), the neuron i is added to S (S1560).

Thereafter, the layer is moved to a high layer (S1570), and an operation of searching for neurons satisfying the above-described conditions 1 and 2 is repeatedly performed.

If this process is performed on a layer-by-layer basis to finish the identification of the neurons requiring re-learning for all the layers (S1550-N), $w_s^t$ is obtained by the above Equation 3.

Therefore, the selective re-learning according to the present embodiment is performed by re-learning only the meaning neurons of the task rather than re-learning the entire weights when expanding the task, i.e., when performing the re-learning, thereby performing the efficient re-learning. In addition, when only the meaning neurons are re-learned, the semantic drift may be prevented. The incremental learning as illustrated in FIG. 15 may be executed on the electronic apparatus having the configuration of FIG. 1 or FIG. 2, or may be performed on an electronic apparatus having another configuration.

Further, the selective re-learning as described above may be implemented in programs including algorithm which may be executed in a computer and the programs may be provided while being stored in a non-transitory computer readable medium.

FIG. 16 is a flowchart for explaining a dynamic network expansion step of FIG. 14.

Referring to FIG. 16, a targeted loss value is calculated in the above-described selective re-learning (S1610).

If the computed loss value has a loss value larger than the reference point (S1620), the network size may be fixedly expanded (S1630). Specifically, hN may be added to all layers.

Thereafter, the above Equation 4 is computed (S1640), and if the current layer is not 0 (S1650-N), the operation of eliminating unnecessary neurons among the expanded neurons is repeatedly performed (S1660).

Then, the layer moves upward (S1670), and the above-described computation operation may be repeated to perform an operation of optimizing the neuron.

Therefore, the dynamic network expansion according to the present embodiment can dynamically expand the network, if necessary, in order to reflect more accurate new tasks. In addition, it is possible not to add neurons to all layers in a batch, but to expand the optimized network by performing unnecessary neuron deletion operations. The dynamic network expansion as illustrated in FIG. 16 may be executed on the electronic apparatus having the configuration of FIG. 1 or FIG. 2, or may be performed on an electronic apparatus having another configuration.

Further, the dynamic network expansion as described above may be implemented in programs including algorithm which may be executed in a computer and the programs may be provided while being stored in a non-transitory computer readable medium.

FIG. 17 is a flowchart for explaining a network split and duplication step of FIG. 14.

Referring to FIG. 17, after the preceding dynamic network expansion operation, $W_{L,K}^{t}$ is computed.

Then, the amount of change (cement draft) is calculated for all hidden neurons (S1730), and it is determined whether the calculated amount of change in the neurons is higher than the reference point (S1740).

As a result of the determination, if the calculated amount of change in the neurons is higher than the reference point a, the corresponding neurons B may be duplicated to expand the network, and the updated neuron B may be returned to the previous step A (S1750).

Then, the above-described confirmation operation is repeatedly performed on all hidden neurons (S1760).

Therefore, in the method for splitting and duplicating a network according to the present embodiment, when the change in the neuron is larger than the reference value, the network is split and duplicated, thereby preventing the semantic drift. The method for splitting and duplication a network as illustrated in FIG. 17 may be executed on the electronic apparatus having the configuration of FIG. 1 or FIG. 2, or may be performed on an electronic apparatus having another configuration.

Further, the method for splitting and duplicating a network as described above may be implemented in programs including algorithm which may be executed in a computer and the programs may be provided while being stored in a non-transitory computer readable medium.

Although the preferred embodiments of the present disclosure have been disclosed for illustrative purposes, those skilled in the art will appreciate that various modifications, additions and substitutions are possible, without departing from the scope and spirit of the present disclosure as disclosed in the accompanying claims. Accordingly, such modifications, additions and substitutions should also be understood to fall within the scope of the present disclosure.

What is claimed is:

1. A method for re-learning a trained model, comprising:
receiving an input trained model consisting of a plurality of neurons and a data set including a new task;
identifying a neuron associated with the new task among the plurality of neurons of the input trained model and selectively re-learning a parameter associated with the new task for the identified neuron, wherein the selectively re-learning only re-learns the identified neuron associated with the new task; and reconstructing the input trained model by adding one or more neurons to a selectively re-learned trained model for dynamically expanding a size of the selectively re-learned trained model on which the selective re-learning is performed to a second size greater than a first size of the input trained model if a loss of the selectively re-learned trained model exceeds a preset loss value, wherein in the reconstructing of the input trained model, when the loss exceeds the preset loss value, the one or more neurons comprising a fixed number of neurons for each layer is added to the selectively re-learned trained model and group sparsity is used to eliminate unnecessary neurons from the added neurons, thereby reconstructing the input trained model, wherein in the reconstructing of the input trained model, an unnecessary neuron is identified from the added neurons using an objective function having a loss function for the input trained model, a regularization term for sparsity, and a group regularization term for group sparsity, wherein in the objective function having loss function (IL) for the input trained model, the regularization term for sparsity is based on an L1 norm and the group regularization term for the group sparsity is based on an L2 norm as follows:

$$\min_{W_l} \mathbb{L}(W_l; W_l^{t-1}, D_t) + \mu \|W_l\|_1 + \gamma \sum_g \|W_{l,g}\|_2,$$

wherein W are the neural network weights, W has L layers indexed by variable 1, t is the current task for which W is being updated, Dt represents data for the current task t, μ is a first hyperparameter, γ is a second hyperparameter, and g represents a group defined as the inflow weights for each neuron.

2. The method as claimed in claim 1, wherein in the selective re-learning, a new parameter matrix is calculated using the data set for a network parameter consisting of only the identified neuron, and the calculated new parameter matrix is reflected to the identified neuron of the trained model to perform the selective re-learning.

3. The method as claimed in claim 1, wherein in the reconstructing of the input trained model, if a change in the identified neuron has a preset value, the identified neuron is duplicated to expand the input trained model, and the identified neuron has an existing value to reconstruct the input trained model.

4. The method as claimed in claim 1, further comprising:
limiting the size of the input trained model based on a cumulative knowledge accounting of the new task.

5. A method of learning a new concept using already-learned knowledge, the method comprising:
training a model to provide a first trained model, the first trained model then being the already-learned knowledge;
classifying first data using the first trained model to provide a first classification;
re-learning the first trained model using the method of claim 1 to provide a second trained model; and
classifying second data using the second trained model to provide a second classification, wherein the second classification corresponds to the new concept.

* * * * *